United States Patent [19]
Hiroki

[11] Patent Number: 4,891,669
[45] Date of Patent: Jan. 2, 1990

[54] SCANNING APPARATUS

[75] Inventor: Masashi Hiroki, Tokyo, Japan

[73] Assignee: Kabushiki Kaisha Toshiba, Kawasaki, Japan

[21] Appl. No.: 212,482

[22] Filed: Jun. 28, 1988

[30] Foreign Application Priority Data

Jun. 30, 1987 [JP] Japan .................................. 62-163047

[51] Int. Cl.⁴ .......................................... G03G 15/04
[52] U.S. Cl. .................................................. 355/235
[58] Field of Search ..................... 355/8, 3 R, 11, 133, 355/50, 51

[56] References Cited

U.S. PATENT DOCUMENTS

| | | | |
|---|---|---|---|
| 4,448,514 | 5/1984 | Fujii et al. .................................. | 355/8 |
| 4,530,591 | 7/1985 | Mastuyama et al. ..................... | 355/8 |
| 4,634,261 | 1/1987 | Nagoshi ...................................... | 355/8 |
| 4,634,267 | 1/1987 | Jones et al. .......................... | 355/8 X |
| 4,636,058 | 1/1987 | Fujii ........................................ | 355/8 |
| 4,645,329 | 2/1987 | Iwaki ....................................... | 355/8 |
| 4,649,437 | 3/1987 | Watanabe ............................ | 355/8 X |
| 4,690,542 | 9/1987 | Furuta et al. ........................ | 355/8 X |

FOREIGN PATENT DOCUMENTS 56-59264  5/1981  Japan ..................................... 355/8

Primary Examiner—R. L. Moses
Attorney, Agent, or Firm—Foley & Lardner, Schwartz, Jeffery, Schwaab, Mack, Blumenthal & Evans

[57] ABSTRACT

A scanning apparatus of an image forming apparatus includes a shaft, a motor for rotating the shaft, a flange fixed to the shaft, a driving pulley, and a timing belt looped around the driving pulley. Upon movement of the timing belt, an optical unit is moved along a surface of a document. The driving pulley is fixed to the flange to be movable in its rotational direction.

7 Claims, 4 Drawing Sheets

SCANNING APPARATUS

BACKGROUND OF THE INVENTION

1. Field of the Invention

The present invention relates to a scanning apparatus for scanning a document and guiding light from a document to a photosensitive body in an image forming apparatus, e.g., an electronic copying machine.

2. Description of the Related Art

An optical unit and a driver are arranged in a scanning apparatus of an electronic copying machine. The optical unit serves to illuminate a document placed on a document table and guides the light reflected by the document onto a photosensitive drum. The driver serves to move the optical unit along the document table so as to scan. The driver comprises a carriage for supporting the optical unit. Both the ends of the carriage are respectively coupled to a pair of timing belts. These timing belts are respectively looped around driving and driven timing pulleys. The driving pulleys are fixed to a single shaft. Annular groove is formed in an end portion of shaft. Each timing pulley has cylindrical portion. Female thread portion is formed in cylindrical portion. Male screw is threadably engaged with female thread portion. The leading end of male screw is brought into contact with groove of shaft. As a result, driving timing pulley is fixed to shaft. The phases of driving timing pulley and shaft in a rotational direction can be shifted from each other by loosening male screw. Timing belt is looped around driving timing pulley.

Driving timing pulley and shaft are coupled to each other only by friction between male screw and shaft. For this reason, when a large torque is applied from timing belt to driving timing pulley, a slip may be caused between driving timing pulley and shaft, thereby shifting the phases of driving timing pulley and shaft from each other. In this case, the carriage is moved while it is tilted, and hence satisfactory scanning cannot be performed.

SUMMARY OF THE INVENTION

It is an object of the present invention to provide a scanning apparatus, in which the phases of a rotatable shaft and a second rotatable member rotated thereby in a rotational direction can be easily adjusted, and the static torque of the second rotatable member can be improved because of friction between a first rotatable member and the second rotatable member, so that a phase shift of the second rotatable member and the rotatable shaft can be reliably prevented even if a large torque is applied to the second rotatable member, thereby performing stable scanning.

According to the present invention, there is provided an apparatus for scanning an original comprising means, located movably along the original, for scanning the original, means for generating a drive force to move the scanning means along the original, means for transmitting drive force from the energizing means to the scanning means, and wherein the transmitting means includes a rotatably shaft to be rotated by the drive, a first rotatable member fixed to said rotatable shaft to be rotated therewith, a second rotatable member attached to the first rotatable member to be rotated with the first rotatable member, at least one of the first and second rotatable members having a portion for changing the relative angular positions of the first and second rotatable members.

DETAILED DESCRIPTION OF THE PREFERRED EMBODIMENT

An embodiment of the present invention will be described below with reference to the accompanying drawings.

Figure 1:
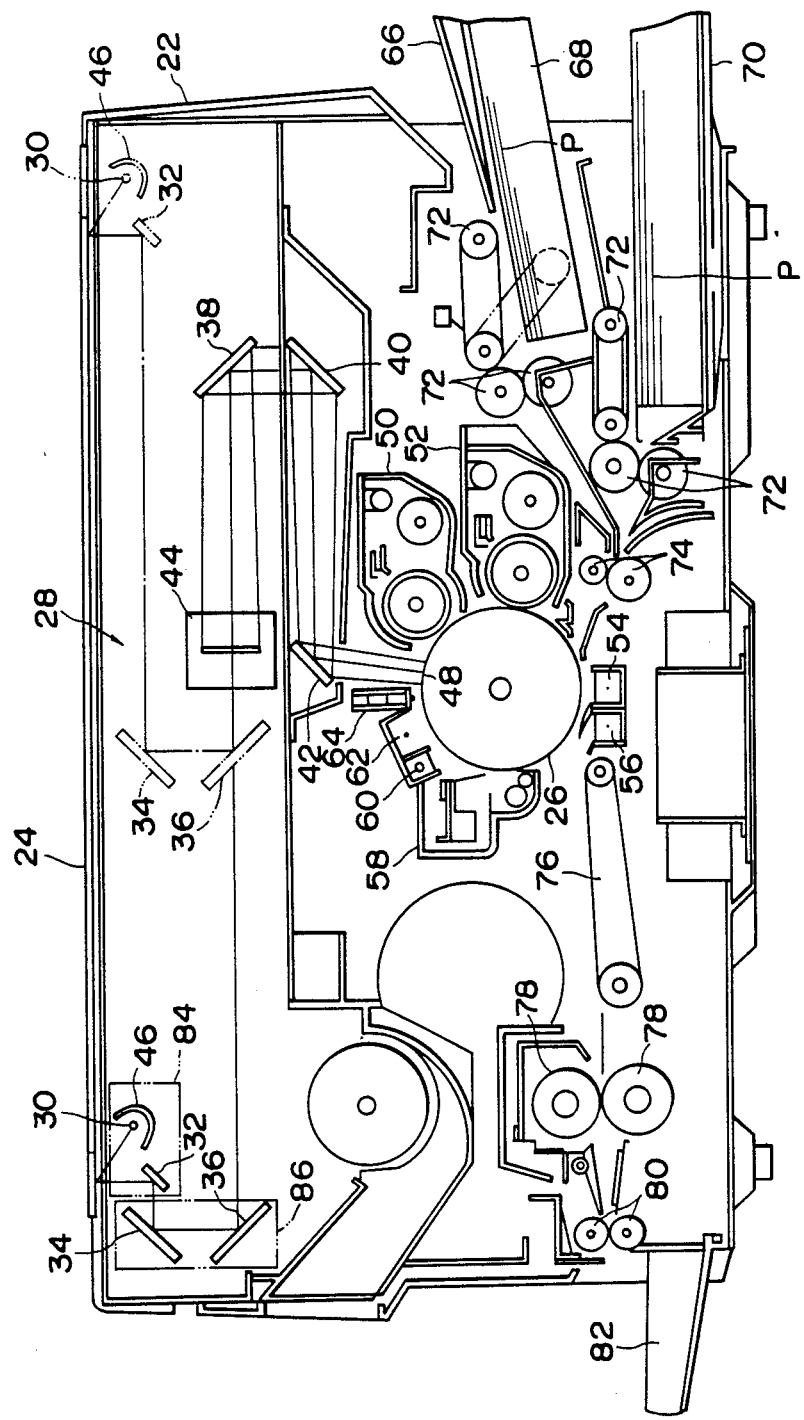
FIG. 1 is a schematic sectional view showing an electronic copying machine as an image forming apparatus.

Referring to FIG. 1, reference numeral 22 denotes a housing of an electronic copying machine as an image forming apparatus. Document table 24, on which a document is placed, is arranged on the upper surface of housing 22. Photosensitive drum 26 is rotatably supported at substantially the center in housing 22. Exposure unit 28 is arranged between photosensitive drum 26 and document table 24. Exposure unit 28 illuminates a document on document table 24 using lamp 30, and guides the light reflected by the document onto photosensitive drum 26 through first to sixth mirrors 32, 34, 36, 38, 40, 42, and 44, thereby forming a document image. Reference numeral 46 denotes a reflector. First developing unit 50, second developing unit 52, transfer charger 54, separation charger 56, cleaner 58, discharge lamp 60, charger 62, and erase array 64 are arranged in the order named along the rotational direction of photosensitive drum 26 from image forming position 48 of exposure unit 28. The surface of photosensitive drum 26 is uniformly charged by charger 62. When a desired area of the document image is to be copied, charges except for those in this area on photosensitive drum 26 are erased by erase array 64. The charges on photosensitive drum 26 are selectively attenuated by exposure unit 28. With this operation, an electrostatic latent image is formed on photosensitive drum 26. This electrostatic latent image is developed by first or second developing unit 50 or 52 to form a toner image. This toner image is transferred onto paper P by transfer charger 54. In this case, paper P is adhered to the surface of photosensitive drum 26 by an electrostatic force. Paper P is separated from the surface of photosensitive drum 26 by separation charger 56. The residual toner which is not transferred from photosensitive drum 26 to paper P and remaining on photosensitive drum 26 is removed by cleaner 58. Subsequently, the charges on photosensitive drum 26 are discharged by discharge lamp 60.

Manual paper feed guide 66, and upper and lower paper feed cassettes 68 and 70 are arranged in one side of the bottom portion of housing 22. Paper P fed from manual paper feed guide 66, or upper or lower paper feed cassette 68 or 70 is guided by a plurality of feed rollers to a pair of aligning rollers 74. Paper P is aligned by aligning rollers 74, and then is supplied between photosensitive drum 26 and transfer charger 54. At this time, a toner on photosensitive drum 26 is transferred onto paper P. Paper P is supplied to a pair of fixing rollers 78 through separation charger 56 and conveyor belt 76. A toner image is fixed on paper P by fixing rollers 78. Paper P is discharged by a pair of discharge rollers 80 onto discharge tray 82 arranged on the other side of housing 22.

Figure 2:
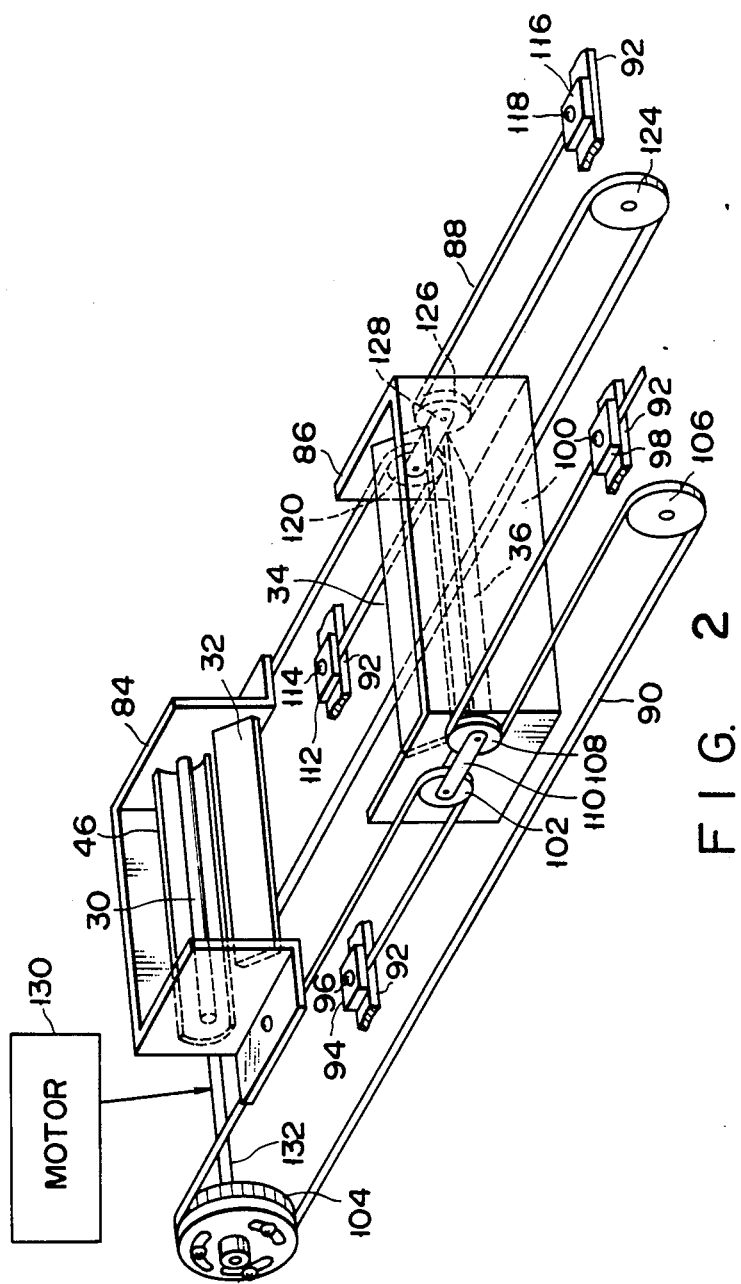
FIG. 2 is a perspective view of a scanning apparatus according to the present invention.

As shown in FIG. 2, lamp 30, first mirror 32, and reflector 46 are supported by first carriage 84, whereas second and third mirrors 34 and 36 are supported by second carriage 86. The front and rear sides (in FIG. 1) of first carriage 84 are respectively supported by front and rear timing belts 88 and 90. One end of rear timing belt 90 is clamped between fixed frame 92 and spacer 94, and fastened and fixed by screw 96. The other end of rear timing belt 90 is also clamped between fixed frame 92 and spacer 98, and is fastened and fixed by screw 100. An intermediate portion of rear timing belt 90 is looped around movable pulley 102, driving pulley 104, stationary pulley 106, and movable pulley 108 in the order named. Movable pulleys 102 and 108 are coupled to each other by link 110. One end of front timing belt 88 is clamped between fixed frame 92 and spacer 112, and is fastened and fixed by screw 114. The other end of front timing belt 88 is clamped between fixed frame 92 and spacer 116, and is fastened and fixed by screw 118. An intermediate portion of front timing belt 88 is looped around movable pulley 120, driving pulley 122 (refer to FIG. 4), stationary pulley 124, and movable pulley 126 in the order named. Movable pulleys 120 and 126 are coupled to each other by link 128. The front and rear sides of second carriage 86 are respectively supported by front and rear links 128 and 110. Second carriage 86 is moved at a speed ½ that of first carriage 84. With this arrangement, the optical path length from the surface of the document to photosensitive drum 26 can be kept constant. Front and rear timing belts 88 and 90 are toothed belts. Front and rear movable pulleys 120 and 102, driving pulleys 122 and 104, stationary pulleys 124 and 106, and movable pulleys 226 and 108 are toothed pulleys.

Rear and front driving pulleys 104 and 122 are mounted on shaft 132 driven by motor 130.

Figure 3:
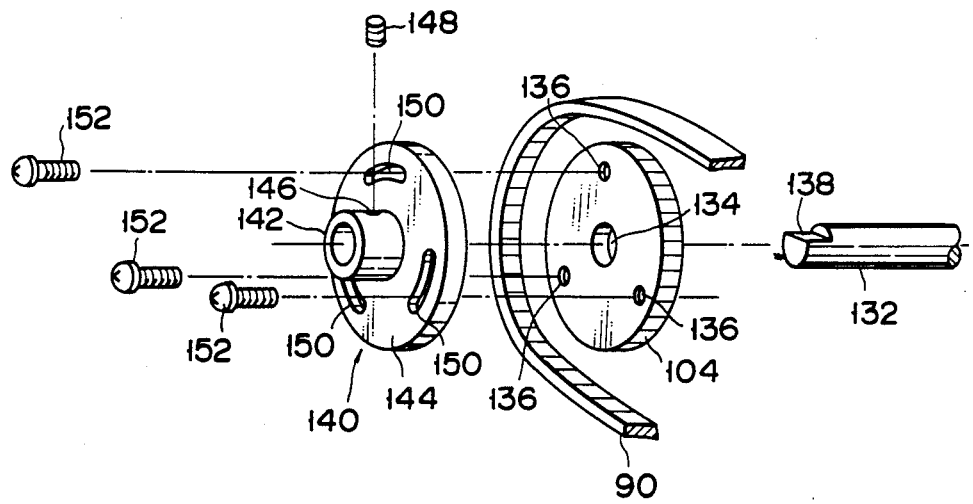
FIGS. 3 and 4 are partial exploded perspective views of the scanning apparatus in FIG. 2.

As shown in FIG. 3, rear driving pulley 122 has hole 134 in its central portion. A portion of shaft 132 near its rear side is rotatably fitted into hole 134. A plurality of female thread portions 136 are formed between hole 134 of rear driving pulley 104 and its peripheral portion. Notched portion 138 is defined at a rear portion of shaft 132. The sectional area of the rear portion of shaft 132 has a D shape because of the presence of notched portion 138. Flange 140 is rotatably fitted on the rear portion of shaft 132. Flange 140 comprises cylindrical portion 142 fitted on shaft 132, and flange portion 144 extending outward from cylindrical portion 142. Female thread portion 146 is formed in cylindrical portion 142. Male screw 148 is threadably engaged with female thread portion 146. The leading end of male screw 148 is brought into contact with notched portion 138 of shaft 132 so that flange 140 is fixed to shaft 132. A plurality of arcuated holes 150 are formed between central and peripheral portions of flange 144 to be elongated along the rotational direction. Male screws 152 are inserted in holes 150. Male screws 152 are threadably engaged with female thread portions 136 of driving pulley 104, and are fastened, thereby fixing driving pulley 104 to shaft 132 through flange 140. The phases between flange 140 and driving pulley 104 can be adjusted by loosening male screws 152. The rear end portion of shaft 132 is coupled to the rotating shaft of motor 130.

Figure 4:
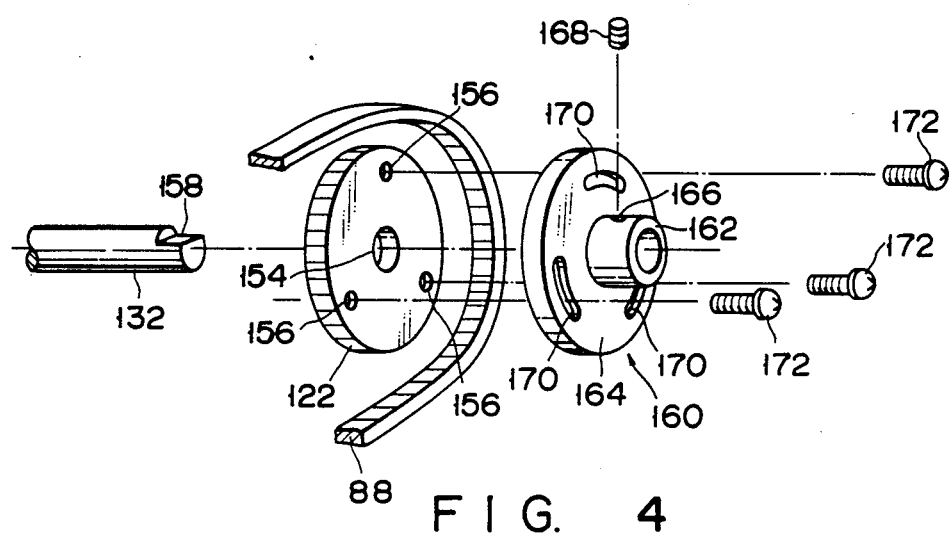

Similarly, front driving pulley 122 has hole 154 formed in its central portion, as shown in FIG. 4. A portion of shaft 132 near its front side is rotatably fitted into hole 154. A plurality of female thread portions 156 are formed between hole 154 and a peripheral portion of front driving pulley 122. Notched portion 158 is defined at a front portion of shaft 132. The sectional area of the front portion of shaft 132 has a D shape because of the presence of notched portion 158. Flange 160 is rotatably fitted on the front portion of shaft 132. Flange 160 comprises cylindrical portion 162 fitted on shaft 132, and flange portion extending outward from cylindrical portion 162. Female thread portion 166 is formed in cylindrical portion 162. Male screw 168 is threadably engaged with female thread portion 166. The leading end of male screw 168 is brought into contact with notched portion 158 of shaft 132 so that flange 160 is fixed to shaft 132. A plurality of arcuated holes 170 are formed between central and peripheral portions of flange 164 to be elongated along the rotational direction. Male screws 172 are inserted into holes 170. Male screws 172 are threadably engaged with female thread portions 156 of driving pulley 122, and are fastened, thereby fixing driving pulley 122 to shaft 132 through flange 160.

According to the above-described arrangement, the phases between flanges 104 and 122, and driving pulleys 140 and 160 are adjusted by loosening male screws 152 and 172.

In addition, since driving pulleys 104 and 122, and flanges 140 and 160 are coupled to each other at positions separated from the central axis, the static torque of driving pulleys 104 and 122 can be improved by friction between driving pulleys 104 and 122, and flanges 140 and 160 upon fastening of male screws 152 and 172. Therefore, even if a large torque is applied to driving pulleys 104 and 122, phase shifts between driving pulleys 104 and 133, and flanges 140 and 160, i.e., phase shifts between driving pulleys 104 and 122, and shaft 132 can be reliably prevented. Since tilting of lamp 30 and first to third mirrors 32 to 36 can be prevented, stable scanning can be performed.

Figure 5:
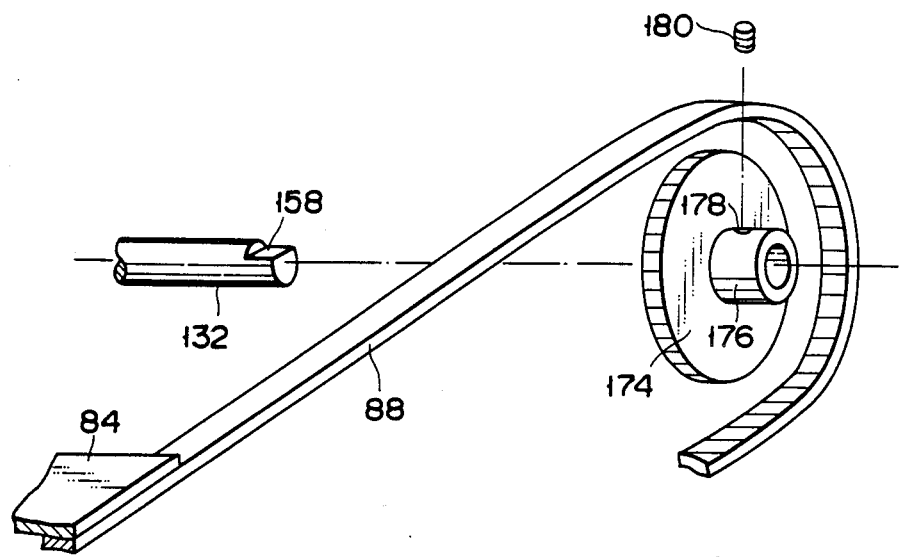
FIG. 5 is a partial exploded perspective view of an optical unit driver according to a modification.

Although in the embodiment described above, rear and front driving pulleys 104 and 122 are fixed to shaft 132 through flanges 140 and 160, the present invention is not limited to this arrangement. For example, as shown in FIG. 5, front driving pulley 174 has cylindrical portion 176 formed on its central portion. A portion of shaft 132 near its front side is rotatably fitted in cylindrical portion 176. Female thread portion 178 is formed in cylindrical portion 176. Male screw 180 is threadably engaged with female thread portion 178. The leading end of male screw 180 is brought into contact with notched portion 158 of shaft 132 so that driving pulley 174 is fixed to shaft 132. With this arrangement, the phases between front driving pulley 174 and shaft 132 cannot be adjusted. However, since rear driving pulley 104 is fixed to shaft 132 through flange 140, the phases between driving pulley 104 and shaft 132 can be adjusted. Therefore, the tilts of lamp 30 and first to third mirrors 32 to 36 can be adjusted. In addition, even if a large torque is applied to driving pulley 174, a phase shift between driving pulley 174 and shaft 132 can be reliably prevented. Consequently, tilting of lamp 30 and first to third mirrors 32 to 36 can be prevented, and stable scanning can be performed.

What is claimed is:

1. An apparatus for scanning an original comprising:

means, located movably along the original, for scanning the original;

means for generating a drive force to move said scanning means along the original;

means for transmitting drive force from said generating means to said scanning means; and wherein said transmitting means includes:

a rotatable shaft to be rotated by the drive;

a first rotatable member fixed to said rotatable shaft to be rotated therewith;

a second rotatable member attached to said first rotatable member to be rotated with said first rotatable member, at least one of said first and second rotatable members having a portion for changing the relative angular positions of said first and second rotatable members.

2. The apparatus according to claim 1, wherein one of said first rotatable member and second rotatable member comprises an elongated hole elongated along a rotational direction thereof, and the other of said first rotatable member and second rotatable member comprises a female thread portion and a male screw which is inserted into said elongated hole and is threadably engaged with said female thread portion so that said second rotatable member is fixed to said first rotatable member to be movable in a rotational direction thereof.

3. The apparatus according to claim 1, wherein said second rotatable member is a timing pulley, and said scanning means is moved by a timing belt looped around and meshed with said timing pulley.

4. The apparatus according to claim 1, further comprising:

a third rotatable member fixed to said rotatable shaft to be rotated therewith;

a fourth rotatable member attached to said third rotatable member to be rotated with said third rotatable member, at least one of said third and fourth rotatable members having a portion to change the relative angular positions of said third and fourth rotatable members.

5. The apparatus according to claim 4, wherein said second and fourth rotatable members are timing pulleys, and wherein said scanning means comprises:

timing belts looped around and meshed with said timing pulleys; and an optical unit having two end portions, for guiding light from a document to a photosensitive drum, one of said timing belts being coupled to one end portion of said optical unit and the other of said timing belts being coupled to the other end portion of said optical unit.

6. The apparatus according to claim 1, further comprising:

a fifth rotatable member fixed to said shaft to be rotated therewith; and said scanning means has an optical unit for guiding light from a document to a photosensitive drum, and a member engaged with said fifth rotatable member to be moved therewith, for moving said optical unit along the surface of the document.

7. The apparatus according to claim 6, wherein said scanning means has another member engaged with said second rotatable member, said optical unit comprises two end portions, said first the member is coupled to one end portion of said optical unit, and said other member is coupled to the other end portion of said optical unit.

* * * * *